(12) United States Patent
Ha et al.

(10) Patent No.: US 9,957,335 B2
(45) Date of Patent: May 1, 2018

(54) COMPOSITION FOR ENCAPSULATION AND ENCAPSULATED APPARATUS INCLUDING THE SAME

(71) Applicants: Kyoung Jin Ha, Uiwang-si (KR); Ji Hye Kwon, Uiwang-si (KR); Seong Ryong Nam, Uiwang-si (KR); Yeon Soo Lee, Uiwang-si (KR); Chang Min Lee, Uiwang-si (KR); Seung Jib Choi, Uiwang-si (KR)

(72) Inventors: Kyoung Jin Ha, Uiwang-si (KR); Ji Hye Kwon, Uiwang-si (KR); Seong Ryong Nam, Uiwang-si (KR); Yeon Soo Lee, Uiwang-si (KR); Chang Min Lee, Uiwang-si (KR); Seung Jib Choi, Uiwang-si (KR)

(73) Assignee: CHEIL INDUSTRIES, INC., Gumi-Si, Kyeongsangbuk-Do (KR)

( * ) Notice: Subject to any disclaimer, the term of this patent is extended or adjusted under 35 U.S.C. 154(b) by 731 days.

(21) Appl. No.: 14/087,049

(22) Filed: Nov. 22, 2013

(65) Prior Publication Data

US 2014/0178675 A1    Jun. 26, 2014

(30) Foreign Application Priority Data

Dec. 20, 2012    (KR) .................. 10-2012-0150059

(51) Int. Cl.
  *C08F 2/48*    (2006.01)
  *C08F 220/10*    (2006.01)

(52) U.S. Cl.
  CPC .............. *C08F 2/48* (2013.01); *C08F 220/10* (2013.01); *Y10T 428/265* (2015.01);
  (Continued)

(58) Field of Classification Search
  None
  See application file for complete search history.

(56) References Cited

U.S. PATENT DOCUMENTS

| 7,767,498 B2 | 8/2010 | Moro et al. | |
| 2007/0049155 A1* | 3/2007 | Moro .................. | H01L 51/448 |
| | | | 445/24 |

(Continued)

FOREIGN PATENT DOCUMENTS

| KR | 2011-0020130 A | 3/2011 |
| KR | 2012-0030290 A | 3/2012 |

(Continued)

OTHER PUBLICATIONS

Hong, KR 10-2012-0050069, English Machine Translation.*
Office Action dated Feb. 17, 2015 in corresponding Korean Patent Application No. 10-2012-0120059.

*Primary Examiner* — Alexandre F Ferre
*Assistant Examiner* — Elaine M Vazquez
(74) *Attorney, Agent, or Firm* — Lee & Morse, P.C.

(57) ABSTRACT

A composition for encapsulation and an encapsulated apparatus, the composition including a (meth)acrylic alkoxysilane monomer including a moiety represented by Formula 1 or 2, below, or an oligomer thereof; a multifunctional (meth)acrylate monomer or an oligomer thereof; and an initiator,

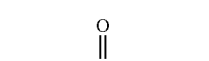
<Formula 1>

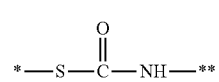

<Formula 2> wherein * and ** represent a binding site between elements.

18 Claims, 1 Drawing Sheet

(52) U.S. Cl.
CPC ............... *Y10T 428/31551* (2015.04); *Y10T 428/31598* (2015.04); *Y10T 428/31605* (2015.04); *Y10T 428/31609* (2015.04)

(56) References Cited

U.S. PATENT DOCUMENTS

| | | | | |
|---|---|---|---|---|
| 2011/0068305 | A1* | 3/2011 | Yeh | C08F 2/48 |
| | | | | 252/582 |
| 2011/0214738 | A1* | 9/2011 | Halahmi | H01L 31/048 |
| | | | | 136/259 |
| 2012/0120347 | A1* | 5/2012 | Takahashi | C08F 2/48 |
| | | | | 349/96 |
| 2012/0168780 | A1* | 7/2012 | Cha | C08L 83/04 |
| | | | | 257/88 |

FOREIGN PATENT DOCUMENTS

| | | | | |
|---|---|---|---|---|
| KR | 2012-0050069 A | 5/2012 | | |
| WO | WO 2013/173074 | * 11/2013 | ............ | C09J 183/04 |

* cited by examiner

COMPOSITION FOR ENCAPSULATION AND ENCAPSULATED APPARATUS INCLUDING THE SAME

CROSS-REFERENCE TO RELATED APPLICATION

Korean Patent Application No. 10-2012-0150059, filed on Dec. 20, 2012, in the Korean Intellectual Property Office, and entitled: "Composition For Encapsulation and Encapsulated Apparatus Including The Same," is incorporated by reference herein in its entirety.

BACKGROUND

1. Field

Embodiments relate to a composition for encapsulation and an encapsulated apparatus including the same.

2. Description of the Related Art

Encapsulating an organic optoelectronic apparatus (such as an organic light emitting diode), an apparatus including photovoltaic cells, a display apparatus (such as an organic thin film transistor display), or the like, may help protect sensitive components from ambient conditions or the atmosphere (e.g., oxygen and/or moisture). Without appropriate protection, the apparatus may suffer quality deterioration. Quality deterioration may be caused by generation of dark spots. In organic light emitting diodes, water vapor may permeate the diodes and may deteriorate diode quality, e.g., quality at an interface between an anode or cathode and an organic film.

Encapsulation may be carried out by bonding a glass cap to a display apparatus using adhesives, e.g., adhesives exhibiting low water vapor permeability. In an implantation, a solid moisture getter may be inserted between a substrate and the cap to help extend the lifespan of the apparatus. Although this may be appropriate for a rigid apparatus, encapsulation using the cap may be inappropriate for an apparatus including a flexible support unit, such as a flexible display.

In addition, such encapsulation technology may not be applied to an apparatus having an insufficient space in a circuit on a substrate, as in a complementary metal oxide semiconductor (CMOS) micro-display, and may not be used for an apparatus having a large emission region to reduce the weight of the apparatus.

In cases in which encapsulation using the cap is inappropriate, "monolithic" encapsulation, e.g., an encapsulation method using a thin film exhibiting good oxygen blocking and water vapor blocking properties may be used. Materials commonly used in this type of method may include oxide dielectrics and/or nitrides, represented by $SiO_x$, $SiN_x$, $SiO_xN_y$, and $Al_xO_y$, and may be deposited by chemical vapor deposition (CVD) or selectively deposited by plasma enhanced chemical vapor deposition (PECVD) or atomic layer deposition (ALD). These processes may be preferred over physical vapor deposition (PVD) methods, such as sputtering, which may be aggressive to organic semiconductors, e.g., causing formation of layers exhibiting unsatisfactory properties upon coating protective layers due to defects, such as generation of a large number of pinholes in the deposited layers. Plasma enhanced chemical vapor deposition and atomic layer deposition may be advantageous in that deposited layers may have a significantly small number of defects and may be extremely uniform, as compared to layers obtained by physical vapor deposition. For example, these two processes may provide excellent step coverage.

SUMMARY

Embodiments are directed to a composition for encapsulation and an encapsulated apparatus including the same.

The embodiments may be realized by providing a composition for encapsulation including a (meth)acrylic alkoxysilane monomer including a moiety represented by Formula 1 or 2, below, or an oligomer thereof; a multifunctional (meth)acrylate monomer or an oligomer thereof; and an initiator,

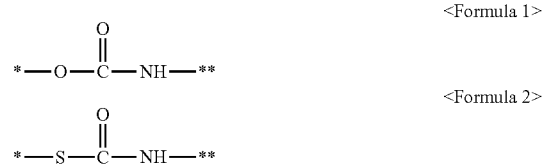

<Formula 1>

<Formula 2> wherein * and ** represent a binding site between elements.

The (meth)acrylic alkoxysilane monomer may have a structure represented by Formula 3:

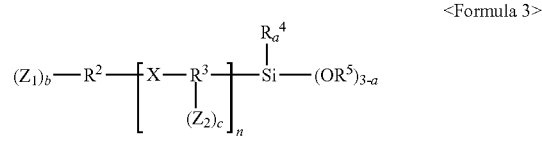

<Formula 3> wherein, in Formula 3, $R^2$ and $R^3$ are each independently a linear or branched $C_1$ to $C_{30}$ aliphatic hydrocarbon group or a $C_6$ to $C_{30}$ aromatic hydrocarbon group; $R^4$ is hydrogen, a linear or branched $C_1$ to $C_{30}$ alkyl group, or a $C_6$ to $C_{30}$ aryl group; $R^5$ is a linear or branched $C_1$ to $C_{30}$ alkyl group; a is an integer from 0 to 2; b and c are each independently an integer from 0 to 4; provided that at least one of b and c is an integer from 1 to 3; n is an integer from 1 to 3; X has a structure represented by Formula 1 or 2; $Z_1$ and $Z_2$ are each independently hydrogen or a group represented by Formula 4, provided that at least one of $Z_1$ and $Z_2$ has a structure represented by Formula 4:

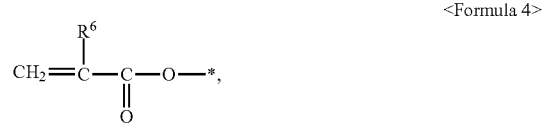

<Formula 4> wherein, in Formula 4, * represents a binding site for a carbon of $R^2$ or $R^3$, and $R^6$ is hydrogen or methyl group.

The (meth)acrylic alkoxysilane monomer may be present in the composition in an amount of about 0.1 wt % to about 85 wt %, in terms of solid content.

The multifunctional (meth)acrylate monomer may include a di(meth)acrylate of a $C_2$ to $C_{20}$ alcohol.

The (meth)acrylic alkoxysilane monomer may have a structure represented by any one of Formulae 5A to 5C, and the multifunctional (meth)acrylate monomer may include 1,12-dodecanediol di(meth)acrylate:

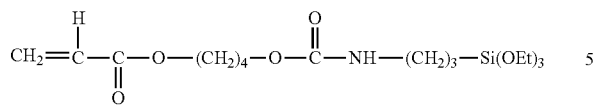

<Formula 5A> wherein, in Formula 5A, Et is an ethyl group,

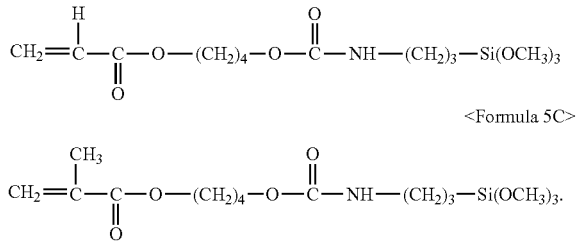

<Formula 5B>

<Formula 5C>

The composition may include about 95 wt % to about 99.9 wt % of the (meth)acrylic alkoxysilane monomer or oligomer thereof and the multifunctional (meth)acrylate monomer or oligomer thereof; and about 0.1 wt % to about 5 wt % of the initiator, all amounts being in terms of solid content in the composition for encapsulation.

The composition may include about 0.1 wt % to about 85 wt % of the (meth)acrylic alkoxysilane monomer or oligomer thereof; about 10 wt % to about 95 wt % of the multifunctional (meth)acrylate monomer or oligomer thereof; and about 0.1 wt % to about 5 wt % of the initiator, all amounts being in terms of solid content in the composition for encapsulation.

The composition for encapsulation may further include a (meth)acrylate monomer having an aromatic group, an alicyclic group, or a heteroalicyclic group, or an oligomer thereof.

The (meth)acrylate monomer having an aromatic group, an alicyclic group, or a heteroalicyclic group may have a structure represented by Formula 6:

<Formula 6> wherein $R^8$ is a $C_6$ to $C_{20}$ aromatic hydrocarbon group, a $C_3$ to $C_{20}$ alicyclic hydrocarbon group, or a $C_4$ to $C_{20}$ heteroalicyclic hydrocarbon group; $R^9$ is a $C_1$ to $C_{10}$ aliphatic hydrocarbon group or a $C_6$ to $C_{20}$ aromatic hydrocarbon group; Y is S, O, or NR, in which R is hydrogen or a $C_1$ to $C_{10}$ alkyl group; f is an integer from 1 to 3; and $Z_1$ has a structure represented by Formula 7:

<Formula 7> wherein * represents a binding site for carbon of $R^9$; $R^{10}$ is hydrogen or methyl group.

The (meth)acrylate monomer having an aromatic group, an alicyclic group, or a heteroalicyclic group may have a structure represented by Formula 8:

<Formula 8>

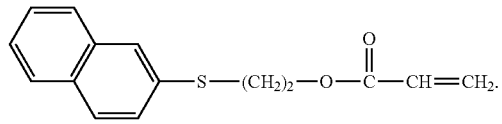

The composition may include about 0.1 wt % to about 50 wt % of the (meth)acrylic alkoxysilane monomer or oligomer thereof; about 30 wt % to about 85 wt % of the multifunctional (meth)acrylate monomer or oligomer thereof; about 0.1 wt % to about 5 wt % of the initiator; and about 5 wt % to about 50 wt % of the (meth)acrylate monomer having an aromatic group, an alicyclic group, or a heteroalicyclic group, or oligomer thereof, all amounts being in terms of solid content in the composition for encapsulation.

The composition may have a viscosity of about 10 cPs to about 50 cPs at 25±2° C.

The embodiments may also be realized by providing a composition for encapsulation having a curing shrinkage of about 10% or less, a storage modulus after curing of about 5 GPa to about 20 GPa, and an adhesive strength to an inorganic barrier layer after curing of about 20 kgf/(mm)$^2$ to about 100 kgf/(mm)$^2$, wherein the composition includes a (meth)acrylic alkoxysilane monomer including a moiety represented by Formula 1 or 2, below, or an oligomer thereof, and a multifunctional (meth)acrylate monomer or an oligomer thereof,

<Formula 1>

<Formula 2> wherein * and ** represent a binding site between elements.

The composition may exhibit a transmittance at a wavelength of 550 nm of about 95% or more after curing.

The composition for encapsulation may further include a (meth)acrylate monomer having an aromatic group, an alicyclic group, or a heteroalicyclic group, or an oligomer thereof.

The embodiments may also be realized by providing an encapsulated apparatus including a member for the apparatus; and a barrier stack on the member for the apparatus, the barrier stack including an inorganic barrier layer and an organic barrier layer, the organic barrier layer being formed from the composition for encapsulation according to an embodiment.

The organic barrier layer may have a storage modulus of about 5 GPa to about 20 GPa, an adhesive strength to an inorganic barrier layer of about 20 kgf/(mm)$^2$ to about 100 kgf/(mm)$^2$, and a transmittance of about 95% or more at a wavelength of 550 nm.

The inorganic barrier layer may include a metal, a metalloid, an intermetallic compound, an alloy, an oxide of a metal, metalloid, or mixed metal, a nitride of a metal, metalloid, or mixed metal, a carbide of a metal, metalloid or mixed metal, an oxygen nitride of a metal, metalloid, or mixed metal, an oxygen boride of a metal, metalloid, or mixed metal, or mixtures thereof, wherein the metal or the metalloid includes at least one of silicon (Si), aluminum (Al), selenium (Se), zinc (Zn), antimony (Sb), indium (In), germanium (Ge), tin (Sn), bismuth (Bi), a transition metal, or a lanthanide.

The organic barrier layer may have a thickness of about 0.1 μm to about 20 μm, and the inorganic barrier layer may have a thickness of about 5 nm to about 500 nm.

The member for the apparatus may include a flexible organic light emitting diode, an organic light emitting diode, an illumination device, a metal sensor pad, a microdisc laser, an electrochromic device, a photochromic device, a microelectromechanical system, a solar cell, an integrated circuit, a charge coupled device, a light emitting polymer, or a light emitting diode.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
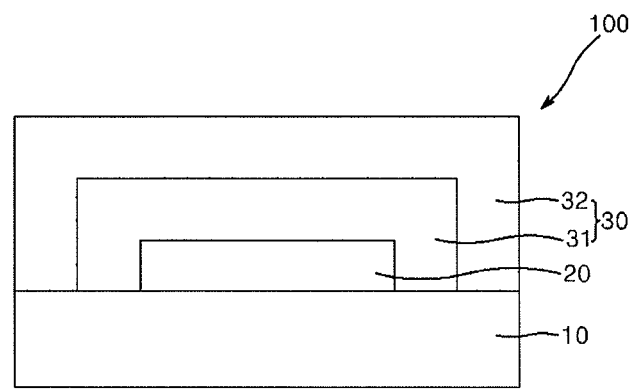
FIG. 1 illustrates a sectional view of an encapsulated apparatus according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "substituted" may mean that at least one hydrogen atom among groups is replaced with a halogen (F, Cl, Br or I), a hydroxyl group, a nitro group, a cyano group, an imino group (=NH, =NR, wherein R is a $C_1$ to $C_{10}$ alkyl group), an amino group [—$NH_2$, —NH(R'), —N(R")(R'")], wherein R', R" and R'" are each independently a $C_1$ to $C_{10}$ alkyl group], a $C_1$ to $C_{20}$ alkyl group, a $C_6$ to $C_{20}$ aryl group, a $C_3$ to $C_{10}$ cycloalkyl group, a $C_3$ to $C_{20}$ heteroaryl group, a $C_2$ to $C_{30}$ heterocycloalkyl group, or a $C_7$ to $C_{21}$ aryl alkyl group.

As used herein, the term "oligomer" may mean a polymer polymerized with a corresponding monomer.

As used herein, the symbols "*" and "**" may mean a binding site between elements or atoms.

As used herein, the term "(meth)acrylic" may mean acrylic and/or methacrylic, "(meth)acrylate" may mean acrylate and/or methacrylate.

An embodiment relates to a composition for encapsulation. The composition may include a (meth)acrylic alkoxysilane monomer including a moiety represented by Formula 1 or 2, below, or an oligomer thereof; and a multifunctional (meth)acrylate monomer or an oligomer thereof:

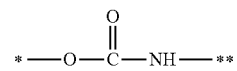

<Formula 1>

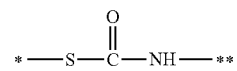

<Formula 2>

In Formula 1 and Formula 2, * and ** represent a binding site between elements or atoms.

The (meth)acrylic alkoxysilane monomer or oligomer thereof may help reduce a curing shrinkage rate of the composition while increasing adhesive strength relative to an inorganic barrier layer after curing of the composition. The (meth)acrylic alkoxysilane monomer or an oligomer thereof may include a urethane group (or a urethane group including sulfur) and a silane group, as shown in Formula 1 or 2. Thus, the composition according to an embodiment and/or an encapsulant prepared using the same may have good plasma-resistant properties. A process for forming an inorganic barrier layer may include using plasma. Thus, the composition according to an embodiment may help decrease the occurrence of defects during the process for forming an inorganic barrier layer. Accordingly, morphology of surface of an organic barrier layer formed from the present invention may be uniformly maintained. Also, if a small amount of water or water vapor were to permeate into a minute defect of the inorganic barrier layer, the silane group of the (meth)acrylic alkoxysilane monomer or oligomer thereof in the organic barrier layer may react with the water or water vapor, and thus may help protect a member for the apparatus (such as an OLED), and may help expand life span of the member of the apparatus.

In an implementation, the composition for encapsulation may include: (A) a (meth)acrylic alkoxysilane monomer or oligomer thereof including a moiety represented by Formula 1 or 2; (B) a multifunctional (meth)acrylate monomer or an oligomer thereof; and (C) an initiator.

The (meth)acrylic alkoxysilane monomer may have a structure represented by Formula 3.

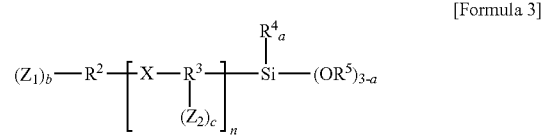

[Formula 3]

In Formula 3, $R^2$ and $R^3$ may each independently be a linear or branched $C_1$ to $C_{30}$ aliphatic hydrocarbon group or a $C_6$ to $C_{30}$ aromatic hydrocarbon group; $R^4$ may be hydrogen, a linear or branched $C_1$ to $C_{30}$ alkyl group, or a $C_6$ to $C_{30}$ aryl group; $R^5$ may be a linear or branched $C_1$ to $C_{30}$ alkyl group; and $Z_1$ and $Z_2$ may are each independently be hydrogen or a group represented by Formula 4.

[Formula 4]

In Formula 4, * represent a binding site for carbon of $R^2$ or $R^3$, and $R^6$ may be hydrogen or a methyl group.

In Formula 3, a may be an integer from 0 to 2; b and c may each independently be an integer from 0 to 4 wherein at least one of b and c is an integer from 1 to 3; n may be an integer from 1 to 3; X may have a structure represented by Formula 1 or 2 above; and at least one of $Z_1$ and $Z_2$ may have a structure represented by Formula 4.

In an implementation, $R^2$ and $R^3$ may be a linear or branched $C_1$ to $C_{30}$ alkylene group or a $C_6$ to $C_{30}$ arylene group, e.g., a $C_1$ to $C_5$ alkylene group.

In an implementation, $R^4$ may be hydrogen or a $C_1$ to $C_5$ alkyl group.

In an implementation, $R^5$ may be a $C_1$ to $C_5$ alkyl group.

In an implementation, b may be 1 and c may be 0.

In an implementation, when n is 1, * may represent a binding site for a carbon of $R^2$, and ** may represent a binding site for a carbon of $R^3$ in Formula 1 or 2 representing X.

In an implementation, the (meth)acrylic alkoxysilane monomer may have a structure represented by any one of Formulae 5A to 5C.

<Formula 5A>

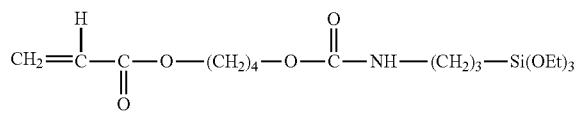

In Formula 5A Et is an ethyl group.

<Formula 5B>

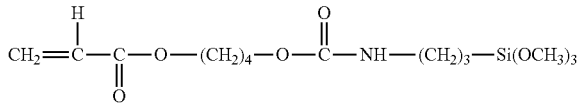

<Formula 5C>

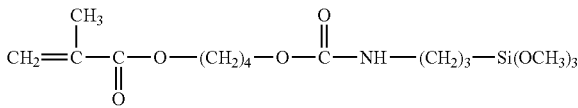

The (meth)acrylic alkoxysilane monomer or oligomer thereof may be a monofunctional or multifunctional monomer or oligomer thereof. In an implementation, the (meth)acrylic alkoxysilane monomer or oligomer thereof may be monofunctional, thereby improving reliability by improving adhesive strength to the inorganic barrier layer after curing of the composition.

The (meth)acrylic alkoxysilane monomer or oligomer thereof may have high surface energy to thereby exhibit good adhesion to materials having a relatively low surface energy. For example, the (meth)acrylic alkoxysilane monomer or oligomer thereof may have an effect of improving surface adhesion to the inorganic barrier layer. The (meth)acrylic alkoxysilane monomer or oligomer thereof may have a surface energy of about 30 mN/m to about 60 mN/m.

The (meth)acrylic alkoxysilane monomer or oligomer thereof may have a weight average molecular weight of about 50 g/mol to about 1,000 g/mol, e.g., about 300 g/mol to about 600 g/mol, for example 300, 350, 400, 450, 500, 550, 600 g/mol. Within this range, the composition may exhibit excellent deposition properties.

The (meth)acrylic alkoxysilane monomer or oligomer thereof may be present in the composition in an amount of about 0.1% by weight (wt %) to about 85 wt %, in terms of solid content of the composition for encapsulation. Within this range, the composition may facilitate encapsulation using organic thin film deposition and may exhibit a low curing shrinkage rate and high adhesion strength to the inorganic barrier layer after curing. In an implementation, the (meth)acrylic alkoxysilane monomer or oligomer thereof may be present in an amount of about 0.1 wt % to about 50 wt %, e.g., about 0.1 wt % to about 30 wt %, about 2 wt % to about 20 wt %, or about 5 wt % to about 20 wt %, for example 0.1, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 wt %.

The multifunctional (meth)acrylate monomer or oligomer thereof may form a network of a thin film encapsulation layer (e.g., the organic barrier layer) after curing of the composition.

The multifunctional (meth)acrylate monomer or oligomer thereof may have about 2 to about 6 (meth)acrylate groups, and may have about 30 or fewer carbon atoms, e.g., about 2 to about 30 carbon atoms per molecule.

Examples of the multifunctional (meth)acrylate monomer may include bifunctional (meth)acrylates, such as 1,4-butanediol di(meth)acrylate, 1,6-hexanediol di(meth)acrylate, 1,12-dodecanediol di(meth)acrylate, neopentylglycol di(meth)acrylate, polyethylene glycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, bis(meth)acryloxyethyl hydroxyl isocyanurate, allylated cyclohexyl di(meth)acrylate, tricyclodecane dimethanol di(meth)acrylate, dimethylol dicyclopentane di(meth)acrylate, ethylene oxide-modified hexahydrophthalic acid di(meth)acrylate, neopentylglycol-modified trimethylpropane di(meth)acrylate, adamantane di(meth)acrylate, 9,9-bis[4-(2-acryloyloxyethoxy)phenyl]fluorene, and the like; tri-functional (meth)acrylates, such as trimethylolpropane tri(meth)acrylate, dipentaerythritol tri(meth)acrylate, propionate-modified dipentaerythritol tri(meth)acrylate, pentaerythritol tri(meth)acrylate, propylene oxide-modified trimethylolpropane tri(meth)acrylate, tri-functional urethane (meth)acrylate, tris(2-(meth)acryloxyethyl)isocyanurate, and the like; tetra-functional (meth)acrylates, such as digylcerol tetra(meth)acrylate, pentaerythritol tetra(meth)acrylate and the like; penta-functional (meth)acrylates, such as dipentaerythritol penta(meth)acrylate, and the like; and hexa-functional (meth)acrylates, such as dipentaerythritol hexa(meth)acrylate, caprolactone-modified dipentaerythritol hexa(meth)acrylate, hexa-functional urethane(meth)acrylate (ex., reactants of isocyanate monomers and trimethylolpropane tri(meth)acrylate), and the like. The multifunctional (meth)acrylate monomers may be used alone or in combination thereof.

In an implementation, the multifunctional (meth)acrylate monomer may include di(meth)acrylates of a $C_2$ to $C_{20}$ alcohol, e.g., 1,4-butanediol di(meth)acrylate, 1,6-hexanediol di(meth)acrylate, 1,12-dodecanediol di(meth)acrylate, or the like.

The multifunctional (meth)acrylate monomer or oligomer thereof may have a weight average molecular weight of about 50 g/mol to about 1,000 g/mol, e.g., about 300 g/mol to about 600 g/mol. Within this range, the composition may exhibit excellent deposition properties.

The multifunctional (meth)acrylate monomer or oligomer thereof may be present in the composition for encapsulation in an amount of about 10 wt % to about 95 wt %, in terms of solid content. Within this range, the composition may facilitate encapsulation using organic thin film deposition, and may have good storage modulus after curing. In an implementation, the multifunctional (meth)acrylate monomer or oligomer thereof may be present in an amount of about 10 wt % to about 60 wt %, e.g., about 30 wt % to about 85 wt %, about 40 wt % to about 77 wt %, or about 75 wt % to about 95 wt %, for example 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95 wt %.

The initiator may include a suitable photopolymerization initiator that allows photocurable reaction. Examples of the initiator may include phosphorous, acetophenone, triazine, benzophenone, thioxanthone, benzoin, oxime initiators, and mixtures thereof. In an implementation, a phosphorous or acetophenone initiator may be used as the initiator.

Examples of the acetophenone initiators may include 2-methyl-1-[4-(methylthio)phenyl]-2-morpholino propan-1-one, 2-benzyl-2-dimethylamino-1-(4-morpholinophenyl)-butan-1-one, and mixtures thereof.

An example of the phosphorous initiator may include diphenyl(2,4,6-trimethylbenzoyl)phosphine oxide.

The initiator may be present in the composition for encapsulation in an amount of about 0.1 wt % to about 5 wt %, in terms of solid content. Within this range, the composition may facilitate sufficient photopolymerization and may help prevent deterioration of transmittance due to remaining unreacted initiator.

A sum of the amount of (A) and (B) in the composition may be about 95 wt % to about 99.9 wt %, in terms of solid content. The initiator (C) may be present in an amount of about 0.1 wt % to about 5 wt %. Within this range, the composition may provide thin film encapsulation, and only a small amount of the initiator may be used such that an amount of gas generated by degradation of the initiator may be reduced. In an implementation, the sum of the amount of (A) and (B) in the composition may be about 95 wt % to about 99 wt %, and the initiator (C) may be present in an amount of about 1 wt % to about 5 wt %.

In an implementation, the composition for encapsulation may include about 0.1 wt % to about 85 wt % of (A), about 10 wt % to about 95 wt % of (B), and about 0.1 wt % to about 5 wt % of (C), in terms of solid content. In an implementation, the composition may include about 2 wt % to about 20 wt % of (A), about 75 wt % to about 95 wt % of (B), and about 0.1 wt % to about 5 wt % of (C), in terms of solid content.

In an implementation, the composition for encapsulation may further include (D) a (meth)acrylate monomer having an aromatic group, an alicyclic group, or a heteroalicyclic group, or an oligomer thereof. Thus, the composition for encapsulation may include the (A) (meth)acrylic alkoxysilane monomer or oligomer thereof, the (B) multifunctional (meth)acrylate monomer or oligomer thereof, the (C) initiator, and the (D) (meth)acrylate monomer having an aromatic group, an alicyclic group, or a heteroalicyclic group, or oligomer thereof. The (D) may be included in the composition for encapsulation to help increase storage modulus after curing of the composition and help increase adhesive strength to the inorganic barrier layer after curing of the composition.

The (D) (meth)acrylate monomer having an aromatic group, an alicyclic group, or a heteroalicyclic group, or oligomer thereof, may have a weight average molecular weight of about 50 g/mol to about 1,000 g/mol, e.g., about 300 g/mol to about 600 g/mol. Within this range, the composition may exhibit excellent deposition properties.

In an implementation, the (meth)acrylate monomer having an aromatic group, an alicyclic group, or a heteroalicyclic group may have a structure represented by Formula 6, below.

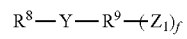

<Formula 6>

In Formula 6, $R^8$ may be a $C_6$ to $C_{20}$ aromatic hydrocarbon group, a $C_3$ to $C_{20}$ alicyclic hydrocarbon group, or a $C_4$ to $C_{20}$ heteroalicyclic hydrocarbon group; $R^9$ may be a $C_1$ to $C_{10}$ aliphatic hydrocarbon group or a $C_6$ to $C_{20}$ aromatic hydrocarbon group; Y may be S, O, or NR (in which R may be hydrogen or a $C_1$ to $C_{10}$ alkyl group); f may be an integer from 1 to 3; and $Z_1$ may have a structure represented by Formula 7, below.

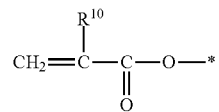

<Formula 7>

In Formula 7, * represents a binding site for a carbon of $R^9$; and $R^{10}$ may be hydrogen or methyl group.

In an implementation, $R^8$ may be a $C_6$ to $C_{12}$ aromatic group, e.g., a naphthalene group. In an implementation, $R^9$ may be a linear or branched $C_1$ to $C_{10}$ alkylene group or a $C_6$ to $C_{20}$ arylene group, e.g., a linear or branched $C_1$ to $C_5$ alkylene group.

The (D) (meth)acrylate monomer having an aromatic group, an alicyclic group, or a heteroalicyclic group, or oligomer thereof may be present in the composition for encapsulation in an amount of about 5 wt % to about 50 wt %, in terms of solid content. Within this range, the composition may provide thin film encapsulation, and may help improve water vapor transmission rate (WVTR). In an implementation, the (D) (meth)acrylate monomer having an aromatic group, an alicyclic group, or a heteroalicyclic group, or oligomer thereof may be present in an amount of about 15 wt % to about 40 wt %, for example 15, 16, 17, 18, 19, 20, 21, 22, 23, 24, 25, 26, 27, 28, 29, 30, 31, 32, 33, 34, 35, 36, 37, 38, 39, 40 wt %.

In an implementation, the composition for encapsulation may include about 0.1 wt % to about 50 wt % of (A), about 30 wt % to about 85 wt % of (B), about 0.1 wt % to about 5 wt % of (C), and about 5 wt % to about 50 wt % of (D), in terms of solid content. In an implementation, the composition may include about 5 wt % to about 20 wt % of (A), about 40 wt % to about 77 wt % of (B), about 0.1 wt % to about 5 wt % of (C), and about 15 wt % to about 40 wt % of (D), in terms of solid content.

In an implementation, the composition for encapsulation may further include an antioxidant (e.g., a heat stabilizer). The antioxidant may help improve heat stability of an encapsulation layer. The antioxidant may include at least one of, e.g., phenol, quinine, amine, and phosphate antioxidants. Examples of antioxidants may include tetrakis[methylene(3,5-di-t-butyl-4-hydroxyhydrocinnamate)]methane, tris(2,4-di-tert-butylphenyl)phosphate, and the like.

The antioxidant may be present in the composition in an amount of 0.01 parts by weight to 3 parts by weight, e.g., 0.01 parts by weight to 1 part by weight, based on 100 total parts by weight of (A) and (B) or of (A), (B), and (D) (when (D) is included in the composition). Within this range, the composition may help prevent change of the film over time after curing, and may exhibit excellent heat stability.

The composition for encapsulation may be formed by mixing (A) and (B) or (A), (B), and (D), and the initiator. In an implementation, the composition for encapsulation may be formed as a solvent-free type composition.

The composition for encapsulation may have a curing shrinkage rate of about 10% or less. Maintaining the curing shrinkage rate at about 10% or less may help prevent a deterioration in smoothing properties caused shrinkage of the organic barrier layer (formed from photo-curing of the composition for encapsulation), thereby helping to reduce and/or prevent defects from being generated during deposition of the inorganic barrier layer and helping to reduce and/or prevent a deterioration in the water vapor transmission rate (WVTR). The display apparatus, e.g. an organic light emitting diode, may not emit light due to oxygen and/or moisture permeating the apparatus. Thus, a possibility of generating dark spots may be reduced and/or eliminated. In addition, in a structure in which the organic layers and the inorganic layers are alternately stacked one above another, e.g., a structure of organic layer/inorganic layer/organic layer/inorganic layer, severe bending at a rim of the apparatus due to severe shrinkage of the organic layers may be reduced and/or prevented, and thin film encapsulation may be secured. Further, obtaining an effect of suppressing pinhole generation by minimizing stress on the deposited inorganic barrier layers during formation of a barrier stack may be obtained. In an implementation, the curing shrinkage rate may be from about 0.01% to about 10%, e.g., about 6.1% to about 9.9%.

The composition for encapsulation may have a viscosity of about 10 cPs to about 50 cPs at 25±12° C. Within this range, deposition of the composition may be achieved.

The composition for encapsulation may have a storage modulus after curing of about 5 GPa to about 20 GPa. Maintaining the storage modulus at about 5 GPa or greater may help ensure that the organic barrier layer does not have an expansive force larger than that of the inorganic layer upon high temperature and high humidity evaluation, thereby reducing and/or preventing the generation of fine cracks in the inorganic layer and reducing and/or preventing a deterioration in reliability. Maintaining the storage modulus at about 20 GPa or less may help reduce and/or prevent generation of cracks in the organic layer upon application of external force exceeding a certain degree, thereby reducing and/or preventing a deterioration in reliability in terms of bending property for flexible displays. In an implementation, the storage modulus may be from about 9 GPa to about 18 GPa.

The storage modulus after curing may be measured with reference to the following examples. For example, when measured at a frequency of 1 rad/sec in a frequency sweep test while increasing temperature from 25° C. to 100° C. at a rate of 10° C./min, the composition may have a storage modulus from about 5 GPa to about 20 GPa at 25° C.

The composition for encapsulation may have an adhesive strength relative to an inorganic barrier layer after curing of about 20 kgf/(mm)$^2$ to about 100 kgf/(mm)$^2$. Maintaining the adhesive strength at about 20 kgf/(mm)$^2$ or greater may help prevent any moisture or oxygen that may permeate from the outside from permeating between the inorganic layer and the organic layer, thereby helping to reduce and/or prevent a deterioration in reliability. Maintaining the adhesive strength at about 100 kgf/(mm)$^2$ or less may help reduce and/or prevent any problems between layers upon photo-curing. The inorganic layer may be formed of inorganic materials, e.g., $SiO_x$, $SiN_x$, $Al_2O_3$, or the like. In an implementation, the adhesive strength may be about 20 kgf/(mm)$^2$ to about 55 kgf/(mm)$^2$.

In an implementation, the composition for encapsulation may have a curing shrinkage rate of about 10% or less, a storage modulus after curing of about 5 GPa to about 20 GPa, and an adhesive strength relative to an inorganic barrier layer after curing of about 20 kgf/(mm)$^2$ to about 100 kgf/(mm)$^2$, and may include the (A) (meth)acrylic alkoxysilane monomer or oligomer thereof and the (B) multifunctional (meth)acrylate monomer or oligomer thereof.

The composition for encapsulation may have a transmittance after curing of about 95% or more. Within this range, the composition may help improve visibility of the display apparatus when encapsulating a member for a display apparatus. The transmittance may be measured at a wavelength of 550 nm. In an implementation, the transmittance may be from about 95% to about 100%.

A member for an apparatus, e.g., a member for a display apparatus, may be degraded or deteriorated in terms of performance due to permeation of ambient gases or liquids, e.g., atmospheric oxygen, moisture, water vapor, and/or chemical materials used in preparation of electronic products. To help prevent the degradation or deterioration, the display apparatus may be sealed or encapsulated. Examples of the member for the apparatus may include members for organic light emitting diodes (OLEDs), illumination devices, flexible organic light emitting diode displays, metal sensor pads, microdisc lasers, electrochromic devices, photochromic devices, microelectromechanical systems, solar cells, integrated circuits, charge coupled devices, light emitting polymers, light emitting diodes, and the like.

The composition for encapsulation may satisfy or exhibit at least one among the above-described curing shrinkage rate, storage modulus, and transmittance, thereby forming an organic barrier layer suitable for sealing or encapsulating a member for a display apparatus, particularly, a flexible display apparatus.

Another embodiment provides an organic barrier layer, which may be formed of the composition for encapsulation.

In an implementation, the organic barrier layer may be formed by photocuring the composition for encapsulation. The composition for encapsulation may be coated to a thickness of about 0.1 μm to about 20 μm, e.g., about 1 μm to about 10 μm, and then cured by UV irradiation at about 10 mW/cm$^2$ to 500 mW/cm$^2$ for about 1 second to 50 seconds.

The organic barrier layer may have the aforementioned properties of the composition for encapsulation after curing. Therefore, the organic barrier layer may form a barrier stack, together with an inorganic barrier layer described below, and thus may be used for encapsulation of an apparatus.

Another embodiment provides a barrier stack, which may include an organic barrier layer formed of the composition for encapsulation and an inorganic barrier layer.

The inorganic barrier layer may be formed of inorganic layers having different components from the organic barrier layer, thereby supplementing the organic barrier layer. Examples of inorganic materials for the inorganic barrier layer may include a metal, a metalloid, an intermetallic compound, an alloy, an oxide of a metal, metalloid, or mixed metal, a nitride of a metal, metalloid, or mixed metal, a carbide of a metal, metalloid or mixed metal, an oxygen nitride (e.g., oxynitride) of a metal, metalloid, or mixed metal, an oxygen boride of a metal, metalloid, or mixed metal, or mixtures thereof. Examples of the metals or metalloids may include silicon (Si), aluminum (Al), selenium (Se), zinc (Zn), antimony (Sb), indium (In), germanium (Ge), tin (Sn), bismuth (Bi), transition metals, lanthanides, and the like. In an implementation, the inorganic barrier layer may include $SiO_x$, $Si_zN_x$, $SiO_xN_y$ (in which x is 1 to 5, y is 1 to 5, and z is 1 to 5), ZnSe, ZnO, $Sb_2O_3$, $Al_2O_3$, $In_2O_3$, $SnO_2$ or the like.

The inorganic barrier layer and the organic barrier layer may be deposited by a vacuum process such as sputtering, chemical vapor deposition, plasma chemical vapor deposition, evaporation, sublimation, electron cyclotron resonance-plasma enhanced chemical vapor deposition, or combinations thereof.

The organic barrier layer may help secure the aforementioned properties of the composition for encapsulation. Therefore, when the organic barrier layer and the inorganic barrier layer are alternately deposited, smoothing properties of the inorganic barrier layer may be secured. In addition, the organic barrier layer may help reduce and/or prevent the likelihood of defects in one inorganic barrier layer from spreading to another inorganic barrier layer.

The barrier stack may include the organic barrier layer and the inorganic barrier layer, although the number of the organic barrier layer and the inorganic barrier layer in the barrier stack is not limited thereto. The combination of the barrier stacks may be modified depending on resistance to permeation of oxygen, moisture, water vapor, and/or chemical materials.

In the barrier stack, the organic barrier layer and the inorganic barrier layer may be alternately deposited. The alternate deposition may provide a favorable effect on the organic barrier layer due to the physical properties of the composition for encapsulation. As a result, the effect on the display apparatus provided by the organic barrier layer and the inorganic barrier layer may be supplemented or reinforced.

FIG. 1 illustrates a structure in which an organic barrier layer 32 and an inorganic barrier layer 31 form a barrier stack 30. The organic barrier layer 32 may be deposited on the inorganic barrier layer 31.

In an implementation, the organic barrier layers and the inorganic barrier layers may be alternately deposited to a total of about 2 to 10 layers, e.g., in a total of about 7 layers or less, or in a total of about 2 to 7 layers. In an implementation, the barrier stack may be formed in a 7-layer structure of inorganic barrier layer-organic barrier layer-inorganic barrier layer-organic barrier layer-inorganic barrier layer-organic barrier layer-inorganic barrier layer.

In the barrier stack, the organic barrier layer may have a thickness of about 0.1 μm to about 20 μm, e.g., about 1 μm to about 10 μm. The inorganic barrier layer may have a thickness of about 5 nm to about 500 nm, e.g., about 5 nm to about 200 nm.

The barrier stack may be a thin film encapsulation member, and may have a thickness of about 5 μm or less, e.g., from about 1.5 μm to about 5 μm.

Yet another embodiment provides an encapsulated apparatus, which may include a member for the apparatus and a barrier stack formed on the member for the apparatus and including an inorganic barrier layer and an organic barrier layer formed of the composition for encapsulation.

Figure 2:
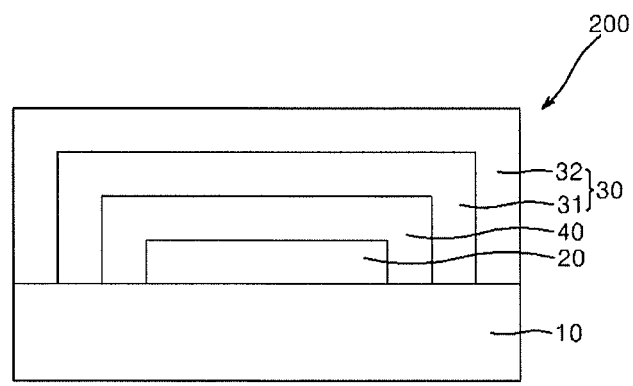
FIG. 2 illustrates a sectional view of an encapsulated apparatus according to another embodiment.

FIGS. 1 and 2 illustrate sectional views of encapsulated apparatuses according to embodiments.

Referring to FIG. 1, the encapsulated apparatus 100 may include: a substrate 10; a member for the apparatus 20 deposited on the substrate 10; and a barrier stack 30 (including an inorganic barrier layer 31 and an organic barrier layer 32) deposited on the member for the apparatus 20.

Referring to FIG. 2, the encapsulated apparatus 200 may include: a substrate 10; a member for the apparatus 20 deposited on the substrate 10; and a barrier stack 30 (including an inorganic barrier layer 31 and an organic barrier layer 32) deposited on the member for the apparatus 20.

In FIG. 1, the member for the apparatus 20 is illustrated as being in contact with the inorganic barrier layer 31, and in FIG. 2, the member for the apparatus 20 is illustrated as not being in contact with the inorganic barrier layer 31, which encapsulates an interior space 40 that receives the member for the apparatus 20.

Detailed descriptions of the member for the apparatus, the organic barrier layer, the inorganic barrier layer and the barrier stack are the same as those described above.

The organic barrier layer may have a storage modulus of about 5 GPa to about 20 GPa, and an adhesive strength relative to an inorganic barrier layer of about 20 kgf/mm² to about 100 kgf/mm².

The organic barrier layer may include a cured product of the composition for encapsulation.

A suitable material that allows the member for the apparatus to be stacked thereon may be used as the substrate. Examples of the substrate material may include transparent glass, plastic sheets, flexible substrates such as silicone, metal substrates, and the like.

In an implementation, the substrate may be omitted, depending on the member for the apparatus.

The encapsulated apparatus may be produced by a suitable method. The member for the apparatus may be formed on the substrate, and an inorganic barrier layer may then be formed thereon. The composition for encapsulation may be coated by spin coating, slit coating, or the like, and may be subjected to irradiation to form an organic barrier layer. The procedure of forming the inorganic barrier layer and the organic barrier layer may be repeated to have, e.g., a 7-layer structure of inorganic barrier layer-organic barrier layer-inorganic barrier layer-organic barrier layer-inorganic barrier layer-organic barrier layer-inorganic barrier layer).

The inorganic barrier layer and the organic barrier layer may be formed by, e.g., deposition.

Yet another embodiment provides a method for encapsulating an apparatus, which may include: stacking at least one of members for the apparatus on a substrate; and depositing at least one barrier layer including at least one inorganic barrier layer and an organic barrier layer and adjoining the member for the apparatus.

Detailed descriptions of the substrate, the member for the apparatus, the inorganic barrier layer, the organic barrier layer and the barrier stack are the same as those described above.

The member for the apparatus may be placed or stacked to adjoin the substrate. This may be carried out in the same manner as in the following methods for forming the inorganic barrier layer and the organic barrier layer.

The inorganic barrier layer and the organic barrier layer may be formed by vacuum processes such as sputtering, chemical vapor deposition, plasma chemical vapor deposition, evaporation, sublimation, electron cyclotron resonance-plasma enhanced chemical vapor deposition, or combinations thereof.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

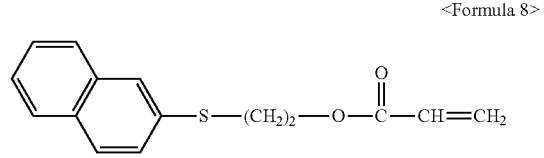

<Formula 8>

Examples 1 to 7 and Comparative Examples 1 to 4

The aforementioned components (A), (B), (C), and (D) were placed in amounts as listed in Table 1, below, (unit: parts by weight, in terms of solid content) in a reactor, followed by blending using a shaker for 3 hours to prepare compositions for encapsulation.

TABLE 1

|   | Example | | | | | | | Comparative Example | | | |
|---|---|---|---|---|---|---|---|---|---|---|---|
|   | 1 | 2 | 3 | 4 | 5 | 6 | 7 | 1 | 2 | 3 | 4 |
| A | 10 | 20 | 5 | 2 | 5 | 10 | 20 | — | 97 | — | 50 |
| B | 87 | 77 | 92 | 95 | 77 | 47 | 47 | 97 | — | 47 | — |
| C | 3 | 3 | 3 | 3 | 3 | 3 | 3 | 3 | 3 | 3 | 3 |
| D | — | — | — | — | 15 | 40 | 30 | — | — | 50 | 47 |
| Sum | 100 | 100 | 100 | 100 | 100 | 100 | 100 | 100 | 100 | 100 | 100 |

Preparative Example: Preparation of Monomer Represented by Formula 5A

In a 2 L reactor, 627.1 g of 4-hydroxybutylacrylate, 372.9 g of 3-isocyanate propyltriethoxysilane and 0.02 g of dibutyltin dilaurate (DBTDL) as a catalyst were placed and stirred at 50° C. for 6 hours, thereby preparing a monomer represented by Formula 5A.

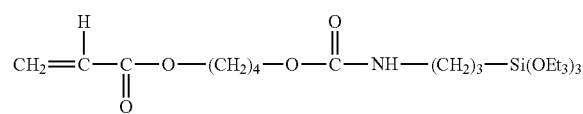

<Formula 5A>

In Formula 5A, Et is an ethyl group.

Details of components used in the Examples and Comparative Examples were as follows:

(A) Monomer prepared in Preparative Example and represented by Formula 5A.

(B) Monomer represented by Formula 9.

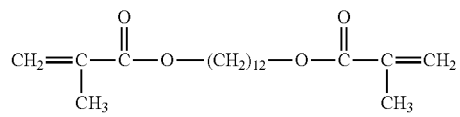

<Formula 9>

(C) Initiator: Diphenyl (2,4,6-trimethyl benzoyl)phosphine oxide.

(D) (Meth)acrylate monomer containing an aromatic group, an alicyclic group, or a heteroalicyclic group: Monomer represented by Formula 8.

The compositions for encapsulation prepared in the Examples and Comparative Examples were evaluated as to properties. The results are shown in Table 2, below.

1. Curing shrinkage rate (%): A specific gravity of each liquid composition before curing and that of each solid after curing were measured using a digital solid gravimeter DME-220E (Shinko Co., Ltd., Japan), and the curing shrinkage rate was calculated using Equation 1. First, each liquid composition was coated to a thickness of 10 μm±2 μm and subjected to UV curing at 100 mW/cm² for 10 seconds to produce a film (thickness: 8 μm to 12 μm, width: 1.5 cm to 2.5 cm, length: 1.5 cm to 2.5 cm). Next, measurements of the specific gravity were performed upon the film. The curing shrinkage rate was calculated by Equation 1:

Curing shrinkage rate (%)=|(specific gravity of solid after curing−specific gravity of liquid composition before curing)|/specific gravity of liquid composition before curing×100.   [Equation 1]

2. Storage modulus (GPa): Each composition was coated onto a cleaned glass substrate and then subjected to UV curing by UV irradiation at 2,000 mJ/cm² to produce a film having a thickness of about 500 μm and a diameter of 25 mm. The storage modulus was measured using a tester ARES-G2 (TA Instrument) at a frequency of 1 rad/sec while increasing the temperature from 25° C. to 100° C. at a heating rate of 10° C./min.

3. Adhesive strength (kgf/mm²): To measure adhesive strength between glass substrates, an upper glass was pushed from a lateral side by a force of 200 kgf at 25° C., and force at a time point of detachment was measured using an adhesive strength tester Dage Series 4000PXY. A lower glass substrate had a size of 2 cm×2 cm×1 mm (width×length×thickness), the upper glass substrate had a size of 1.5 cm×1.5 cm×1 mm (width×length×thickness), and an adhesive layer had a thickness of 500 μm.

4. Transmittance (%): Each composition was coated onto a cleaned glass substrate within a thickness range of 10 μm±2 μm and then subjected to UV curing at 100 mW/cm² for 10 seconds to produce a film (thickness: 9 μm±2 μm). Visible light transmittance of the prepared film was measured at a wavelength of 550 nm using a Lambda 950 (Perkin Elmer Co., Ltd.).

TABLE 2

|  | Example | | | | | | | Comparative Example | | | |
| --- | --- | --- | --- | --- | --- | --- | --- | --- | --- | --- | --- |
|  | 1 | 2 | 3 | 4 | 5 | 6 | 7 | 1 | 2 | 3 | 4 |
| Curing shrinkage rate (%) | 7.3 | 6.9 | 8.5 | 9.9 | 7.2 | 6.3 | 6.1 | 10.5 | 5.1 | 5.8 | 5.0 |
| Storage modulus (GPa) | 15.6 | 15.1 | 16.6 | 17.1 | 15.5 | 10.2 | 9.9 | 17.8 | 3.2 | 8.8 | 3.7 |
| Adhesive strength (kgf/(mm)$^2$) | 38 | 46 | 31 | 22 | 35 | 41 | 52 | 13 | 33 | 18 | 16 |
| Transmittance (%) | 96.2 | 96.4 | 96.6 | 96.5 | 96.3 | 96.3 | 96.8 | 96.1 | 96.4 | 96.2 | 96.5 |

As may be seen in Table 2, the compositions for encapsulation according to the Examples realized desired properties in terms of curing shrinkage rate, storage modulus, and adhesive strength relative to an inorganic layer, and exhibited good effects of blocking moisture and oxygen, thereby providing good reliability.

The compositions according to Comparative Examples 1 to 4, which did not include the (meth)acrylic alkoxysilane monomer or oligomer thereof and the multifunctional (meth) acrylate monomer or an oligomer thereof, did not provide the aforementioned properties.

By way of summation and review, various attempts have been made to develop a multiple layer structure, e.g., organic/inorganic/organic/inorganic layers, named Barix™, to help prevent inorganic layers from associating with each other. The above method may allow a water vapor permeability rate to be reduced to about 10 g$^{-6}$/m$^2$/day, whereby an organic light emitting diode display apparatus may have a sufficient lifespan for commercialization thereof.

Another large group of multilayer encapsulation structures is "NONON" from Philips Co., Ltd., including alternating nitride layers and oxide layers, such as SiN$_x$/SiO$_x$/SiN$_x$/SiO$_x$, and the like.

A water vapor permeability rate of about 10$^{-6}$ g/m$^2$/day may be secured by repeated deposition of 5 layers of an acrylic organic material and 5 layers of an inorganic material through vacuum deposition. The organic layers may be formed of an organic material exhibiting no barrier properties. Thus, there may be a disadvantage of poor reliability due to failure of light emission by corrosion of a cathode layer caused by moisture permeation. In addition, when 10 layers are deposited, and the organic layer has an insufficient thickness, smoothing properties may be deteriorated with increase in the number of organic layers deposited on the inorganic layer. When aluminum oxide (exhibiting excellent barrier properties) is used alone, pinholes generated during deposition may grow so that moisture and oxygen may easily permeate even through the layer is thick. As a result, adhesion between the inorganic layer and the organic layer may be lowered, thereby causing deterioration of a moisture blocking effect.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composition for encapsulation, comprising:
   greater than 10 wt % to about 85 wt % of a (meth)acrylic alkoxysilane monomer including a moiety represented by Formula 1 or 2, below, or an oligomer thereof;
   about 10 wt % to about 89 wt % of a multifunctional (meth)acrylate monomer or an oligomer thereof; and
   about 0.1 wt % to about 5 wt % of an initiator, all amounts being in terms of solid content in the composition for encapsulation,

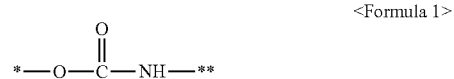

<Formula 1>

<Formula 2> wherein * and ** represent a binding site between elements, and wherein the multifunctional (meth)acrylate monomer or oligomer thereof has a weight average molecular weight of about 50 g/mol to about 1,000 g/mol.

2. The composition for encapsulation as claimed in claim 1, wherein the (meth)acrylic alkoxysilane monomer has a structure represented by Formula 3:

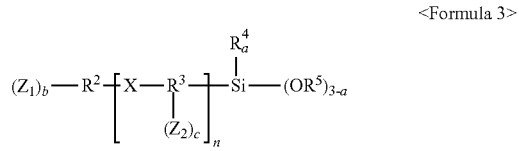

<Formula 3> wherein, in Formula 3, R$^2$ and R$^3$ are each independently a linear or branched C$_1$ to C$_{30}$ aliphatic hydrocarbon group or a C$_6$ to C$_{30}$ aromatic hydrocarbon group; R$^4$ is hydrogen, a linear or branched C$_1$ to C$_{30}$ alkyl group, or a C$_6$ to C$_{30}$ aryl group; R$^5$ is a linear or branched C$_1$ to C$_{30}$ alkyl group; a is an integer from 0 to 2; b and c are each independently an integer from 0 to 4; provided that at least one of b and c is an integer from 1 to 3; n is an integer from 1 to 3; X has a structure represented by Formula 1 or 2; $Z_1$ and $Z_2$ are each independently hydrogen or a group represented by Formula 4, provided that at least one of $Z_1$ and $Z_2$ has a structure represented by Formula 4:

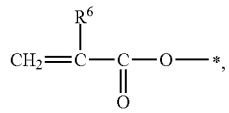
<Formula 4> wherein, in Formula 4, * represents a binding site for a carbon of $R^2$ or $R^3$, and $R^6$ is hydrogen or methyl group.

3. The composition for encapsulation as claimed in claim 1, wherein the multifunctional (meth)acrylate monomer includes a di(meth)acrylate of a $C_2$ to $C_{20}$ alcohol.

4. The composition for encapsulation as claimed in claim 1, wherein the (meth)acrylic alkoxysilane monomer has a structure represented by any one of Formulae 5A to 5C, and the multifunctional (meth)acrylate monomer includes 1,12-dodecanediol di(meth)acrylate:

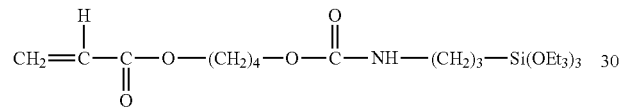
<Formula 5A> wherein, in Formula 5A, Et is an ethyl group,

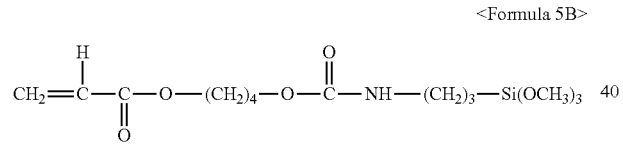
<Formula 5B>

<Formula 5C>

5. The composition for encapsulation as claimed in claim 1, wherein the composition includes:
about 95 wt % to about 99.9 wt % of the (meth)acrylic alkoxysilane monomer or oligomer thereof and the multifunctional (meth)acrylate monomer or oligomer thereof.

6. The composition for encapsulation as claimed in claim 1, wherein the composition has a viscosity of about 10 cPs to about 50 cPs at 25±2° C.

7. The composition for encapsulation as claimed in claim 1, further comprising a (meth)acrylate monomer having an aromatic group, an alicyclic group, or a heteroalicyclic group, or an oligomer thereof.

8. The composition for encapsulation as claimed in claim 7, wherein the (meth)acrylate monomer having an aromatic group, an alicyclic group, or a heteroalicyclic group has a structure represented by Formula 6:

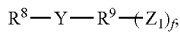
<Formula 6> wherein $R^8$ is a $C_6$ to $C_{20}$ aromatic hydrocarbon group, a $C_3$ to $C_{20}$ alicyclic hydrocarbon group, or a $C_4$ to $C_{20}$ heteroalicyclic hydrocarbon group; $R^9$ is a $C_1$ to $C_{10}$ aliphatic hydrocarbon group or a $C_6$ to $C_{20}$ aromatic hydrocarbon group; Y is S, O, or NR, in which R is hydrogen or a $C_1$ to $C_{10}$ alkyl group; f is an integer from 1 to 3; and $Z_1$ has a structure represented by Formula 7:

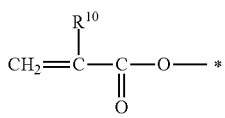
<Formula 7> wherein * represents a binding site for carbon of $R^9$; $R^{10}$ is hydrogen or methyl group.

9. The composition for encapsulation as claimed in claim 7, wherein the (meth)acrylate monomer having an aromatic group, an alicyclic group, or a heteroalicyclic group has a structure represented by Formula 8:

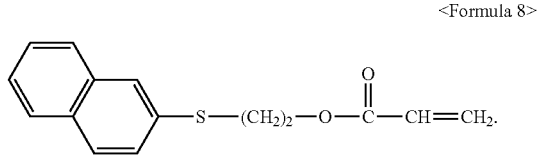
<Formula 8>

10. The composition for encapsulation as claimed in claim 7, wherein the composition includes:
about 5 wt % to about 50 wt % of the (meth)acrylate monomer having an aromatic group, an alicyclic group, or a heteroalicyclic group, or oligomer thereof.

11. A composition for encapsulation having a curing shrinkage of about 10% or less, a storage modulus after curing of about 5 GPa to about 20 GPa, and an adhesive strength to an inorganic barrier layer after curing of about 20 kgf/(mm)² to about 100 kgf/(mm)², wherein the composition includes:
greater than 10 wt % to about 85 wt % of a (meth)acrylic alkoxysilane monomer including a moiety represented by Formula 1 or 2, below, or an oligomer thereof, and about 10 wt % to about 89 wt % of a multifunctional (meth)acrylate monomer or an oligomer thereof, all amounts being in terms of solid content in the composition for encapsulation,

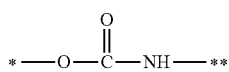
<Formula 1>

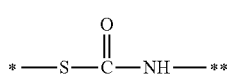
<Formula 2> wherein * and ** represent a binding site between elements, and wherein the multifunctional (meth)acrylate monomer or oligomer thereof has a weight average molecular weight of about 50 g/mol to about 1,000 g/mol.

12. The composition for encapsulation as claimed in claim 11, wherein the composition exhibits a transmittance at a wavelength of 550 nm of about 95% or more after curing.

13. The composition for encapsulation as claimed in claim 11, further comprising a (meth)acrylate monomer having an aromatic group, an alicyclic group, or a heteroalicyclic group, or an oligomer thereof.

14. An encapsulated apparatus, comprising:
a member for the apparatus; and
a barrier stack on the member for the apparatus, the barrier stack including an inorganic barrier layer and an organic barrier layer, the organic barrier layer being formed from the composition for encapsulation as claimed in claim 1.

15. The encapsulated apparatus as claimed in claim 14, wherein the organic barrier layer has a storage modulus of about 5 GPa to about 20 GPa, an adhesive strength to an inorganic barrier layer of about 20 kgf/(mm)$^2$ to about 100 kgf/(mm)$^2$, and a transmittance of about 95% or more at a wavelength of 550 nm.

16. The encapsulated apparatus as claimed in claim 14, wherein the inorganic barrier layer includes a metal, a metalloid, an intermetallic compound, an alloy, an oxide of a metal, metalloid, or mixed metal, a nitride of a metal, metalloid, or mixed metal, a carbide of a metal, metalloid or mixed metal, an oxygen nitride of a metal, metalloid, or mixed metal, an oxygen boride of a metal, metalloid, or mixed metal, or mixtures thereof, wherein the metal or the metalloid includes at least one of silicon (Si), aluminum (Al), selenium (Se), zinc (Zn), antimony (Sb), indium (In), germanium (Ge), tin (Sn), bismuth (Bi), a transition metal, or a lanthanide.

17. The encapsulated apparatus as claimed in claim 14, wherein:
the organic barrier layer has a thickness of about 0.1 μm to about 20 μm, and
the inorganic barrier layer has a thickness of about 5 nm to about 500 nm.

18. The encapsulated apparatus as claimed in claim 14, wherein the member for the apparatus includes a flexible organic light emitting diode, an organic light emitting diode, an illumination device, a metal sensor pad, a microdisc laser, an electrochromic device, a photochromic device, a microelectromechanical system, a solar cell, an integrated circuit, a charge coupled device, a light emitting polymer, or a light emitting diode.

* * * * *